United States Patent
Muttik et al.

(10) Patent No.: US 9,864,629 B2
(45) Date of Patent: *Jan. 9, 2018

(54) REAL-TIME CODE AND DATA PROTECTION VIA CPU TRANSACTIONAL MEMORY SUPPPORT

(71) Applicant: McAfee, Inc., Santa Clara, CA (US)

(72) Inventors: Igor Muttik, Berkhamsted (GB); Alex Nayshtut, Gan Yavne (IL); Yuriy Bulygin, Beaverton, OR (US); Andrew A. Furtak, Beaverton, OR (US); Roman Dementiev, Heidelberg (DE)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/337,724

(22) Filed: Oct. 28, 2016

(65) Prior Publication Data

US 2017/0046196 A1   Feb. 16, 2017

Related U.S. Application Data

(63) Continuation of application No. 14/581,099, filed on Dec. 23, 2014, now Pat. No. 9,507,938.

(51) Int. Cl.
*H04L 29/06* (2006.01)
*G06F 9/46* (2006.01)
*G06F 21/56* (2013.01)
*G06F 12/14* (2006.01)

(52) U.S. Cl.
CPC .......... *G06F 9/467* (2013.01); *G06F 12/1475* (2013.01); *G06F 21/56* (2013.01); *G06F 2212/1052* (2013.01)

(58) Field of Classification Search
CPC ....... G06F 9/467; G06F 12/1475; G06F 21/56
USPC ......................................................... 726/23
See application file for complete search history.

(56) References Cited

U.S. PATENT DOCUMENTS

| | | | | |
|---|---|---|---|---|
| 7,730,286 | B2* | 6/2010 | Petersen | G06F 11/141 711/147 |
| 2003/0212902 | A1* | 11/2003 | van der Made | G06F 21/563 726/26 |
| 2003/0236986 | A1* | 12/2003 | Cronce | G06F 21/14 713/189 |
| 2007/0226703 | A1* | 9/2007 | Sharapov | G06F 12/0862 717/131 |
| 2010/0169579 | A1* | 7/2010 | Sheaffer | G06F 12/084 711/141 |
| 2010/0306751 | A1* | 12/2010 | Schneider | G06F 8/4435 717/143 |
| 2015/0088599 | A1* | 3/2015 | Gatti | G06Q 30/0201 705/7.29 |
| 2015/0277914 | A1* | 10/2015 | Kelm | G06F 9/52 712/226 |

(Continued)

*Primary Examiner* — Michael S McNally
(74) *Attorney, Agent, or Firm* — Blank Rome, LLP

(57) ABSTRACT

A technique allows for memory bounds checking for dynamically generated code by using transactional memory support in a processor. The memory bounds checking includes creating output code, identifying read-only memory regions in the output code and creating a map that is provided to a security monitoring thread. The security monitoring thread executes as a transaction and determines if a transactional conflict occurs to the read-only memory region during parallel execution of a monitored thread in the output code.

25 Claims, 4 Drawing Sheets

(56) References Cited

U.S. PATENT DOCUMENTS

2016/0006759 A1\* 1/2016 Kemp .................. G06F 21/554
                                                          726/23

\* cited by examiner

US 9,864,629 B2

REAL-TIME CODE AND DATA PROTECTION VIA CPU TRANSACTIONAL MEMORY SUPPPORT

TECHNICAL FIELD

Embodiments described herein generally relate to computer security and malware protection, and more particularly to techniques for using transactional memory to protect real-time code and data conversion.

BACKGROUND ART

Today, compilers, for example, Binary Translation (BT) compilers and Just-In-Time (JIT) converters may generate output code for execution on a machine or processor. Ordinarily, compilers or convertors take source code and create executable BT or JIT output. Compilers may statically compile source code into machine code for execution on the same machine or processor or may create byte code on a first machine or processor, wherein the bytecode is subsequently input to a JIT compiler, a dynamic compiler, on a second machine or processor. Compilers perform this conversion and may generate memory-maps for identifying instructions and identifying data. Further, these memory maps may identify modifiable and non-modifiable memory locations for code and data. Similarly, JIT conversion may convert pseudo code (e.g., interpreted code) and convert it into native code during execution. During BT or JIT conversion, dynamic output code that is generated is intended to be only executed and not modified. However, unless protected, output code may become a target of an attack such as, for example, attack by malware or similar that exploits vulnerabilities in the generated output code.

Current protection methods for BT or JIT compilation include writing BT/JIT code into memory pages and declaring these memory pages as read-only (or execute only). Another protection method segments output code and injects guard pages between these segments. However, these methods are not effective. Memory paging and segmentation require expensive hypervisor or operating system (OS) operations to mark memory pages as read-only in page tables and/or in extended page tables, and for very dynamic type of code translation, the overhead of a hypervisor or OS can be very high. Additionally, paging mechanisms define large blocks of memory for pages (typically 4096 bytes) as read-only for enforcement of security access rights. However, if certain memory regions in these memory pages need to be changed later (for example, to optimize performance), it is impossible to change these memory pages without changing how the BT or JIT output code is generated. A technique for protecting compiler output code and data generated dynamically with finer grain granularity would be desirable.

DESCRIPTION OF EMBODIMENTS

Figure 1:
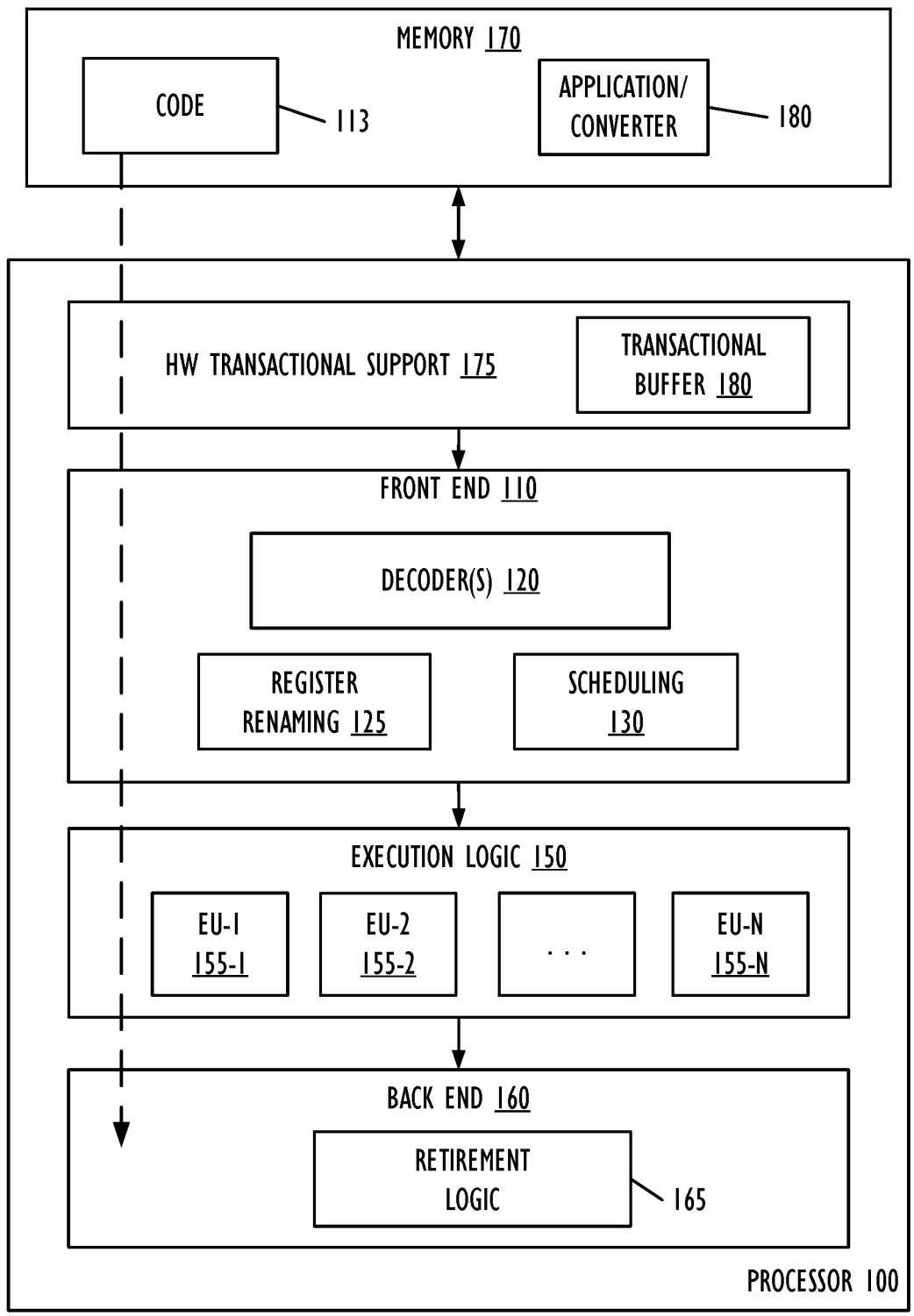
FIG. 1 is a block diagram illustrating a system for providing code and data protection according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, scareware, software exploits and any other type of malicious programs or code.

As used herein, the term "transactional synchronization extensions" or "TSX" can refer to a set of instruction set extensions that allow programmers to specify regions of code for transactional synchronization. In transactional synchronization, programmer-specified code regions are executed as a transaction. A processor makes architectural updates performed within a transactional region visible to other logical processors only on a successful commit, a process referred to as an atomic commit.

As used herein, the term "transactional execution" can refer to a thread's execution of a block of instructions speculatively as an atomic operation. That is, the thread executes the instructions but other threads are not allowed to see the result until commit or abort. With transactional memory, threads start a transaction before attempting any modification to the structure, make their changes and when they've finished, commit the transaction. During the transaction, the transactional memory system takes note of all the memory that the thread reads and writes. During transactional execution, at least some, if not all, speculatively running threads may share the same memory space.

A technique allows for data and code protection via memory bounds checking for BT or JIT generated code by using restricted transactional memory support in a processor (CPU). The memory bounds checking can verify the correctness of code conversion and can also effectively suppress exploitation of many software vulnerabilities in the code. In order to use restricted transactional memory support, a memory map is created during BT/JIT conversion that is supplied to a security monitoring thread executed as a transaction. In embodiments, memory bounds checking may include creating output code, identifying read-only memory regions in the output code and creating a map that is provided to a security monitoring thread. The security monitoring thread may execute as a transaction and may determine if a transactional conflict occurs to the read-only memory region during parallel execution of a monitored thread in the output code.

Referring to the figures, FIG. 1 illustrates an example processor core 100 according to one embodiment. Processor core 100 may be the core for any type of processor, such as a micro-processor, an embedded processor, a digital signal processor (DSP), a network processor or other device to execute code. Although only one processor core 100 is illustrated in FIG. 1, a processing element may alternatively include more than one processor core 100 illustrated in FIG. 1, such as a multi-core processor depicted in FIGS. 4 and 5, below). Processor core 100 may include a multi-threaded core in that it may include more than one hardware thread context (or "logical processor") per core.

FIG. 1 also illustrates a memory 170 coupled to processor 100. Memory 170 may be any of a wide variety of memories (including various layers of memory hierarchy) as are known or otherwise available to those of skill in the art. Memory 170 may include one or more code instruction(s) 113 to be executed by processor core 100. Processor core 100 may follow a program sequence of instructions indicated by code 113 that may be implemented by a converter 180. In an embodiment, converter 180 may be a Binary Translator or a JIT converter, a dynamic compiler. In another embodiment, code 113 may include bytecode that is being dynamically compiled into machine code for execution on processor 100 or machine code for a multi-core processor. Each instruction enters a front end portion 110 and is processed by one or more decoders 120. Decoder 120 may generate as its output a micro operation such as a fixed width micro operation in a predefined format, or may generate other instructions, microinstructions, or control signals which reflect the original code instruction. Front end 110 also includes register renaming logic 125 and scheduling logic 130, which generally allocate resources and queue the operation corresponding to the convert instruction for execution.

Processor core 100 may include execution logic 150 having a set of execution units 155-1 through 155-N. Some embodiments may include a number of execution units dedicated to specific functions or sets of functions. Other embodiments may include only one execution unit or one execution unit that can perform a particular function. The execution logic 150 performs the operations specified by code instructions.

After completion of execution of the operations specified by the code instructions, back end logic 160 may retire the instructions of the code 113 after a commit. In one embodiment, processor 100 may allow out of order execution but requires in order retirement of instructions. Retirement logic 165 may take a variety of forms as known to those of skill in the art (e.g., re-order buffers or the like). In this manner, processor core 100 is transformed during execution of the code 113, at least in terms of the output generated by decoder 120, hardware registers and tables utilized by the register renaming logic 125, and any registers (not shown) modified by the execution logic 150. Processor core 100 may also include hardware transactional memory support 175 (e.g., through TSX by Intel Corporation). Transactional memory support may include Restricted Transactional Memory (RTM) that allows for atomic execution of code (also called a transaction). Transactional memory support may also be used to provide real-time code and data protection by imposing bounds checking during dynamic execution of code 113.

Although not illustrated in FIG. 1, a processing element may include other elements on chip with processor core 100. For example, a processing element may include memory control logic such as, for example, MC 472 of FIG. 4, below) along with processor core 100. The processing element may include I/O control logic and/or may include I/O control logic integrated with memory control logic such as, for example, CL 482 of FIG. 4 or CL 572 of FIG. 5, below. The processing element may also include guard memory regions which utilize a transactional buffer 180, one or more caches including cache lines and guard memory regions in order to impose bounds checking for code 113 that is executed using processor core 100.

Figure 2:
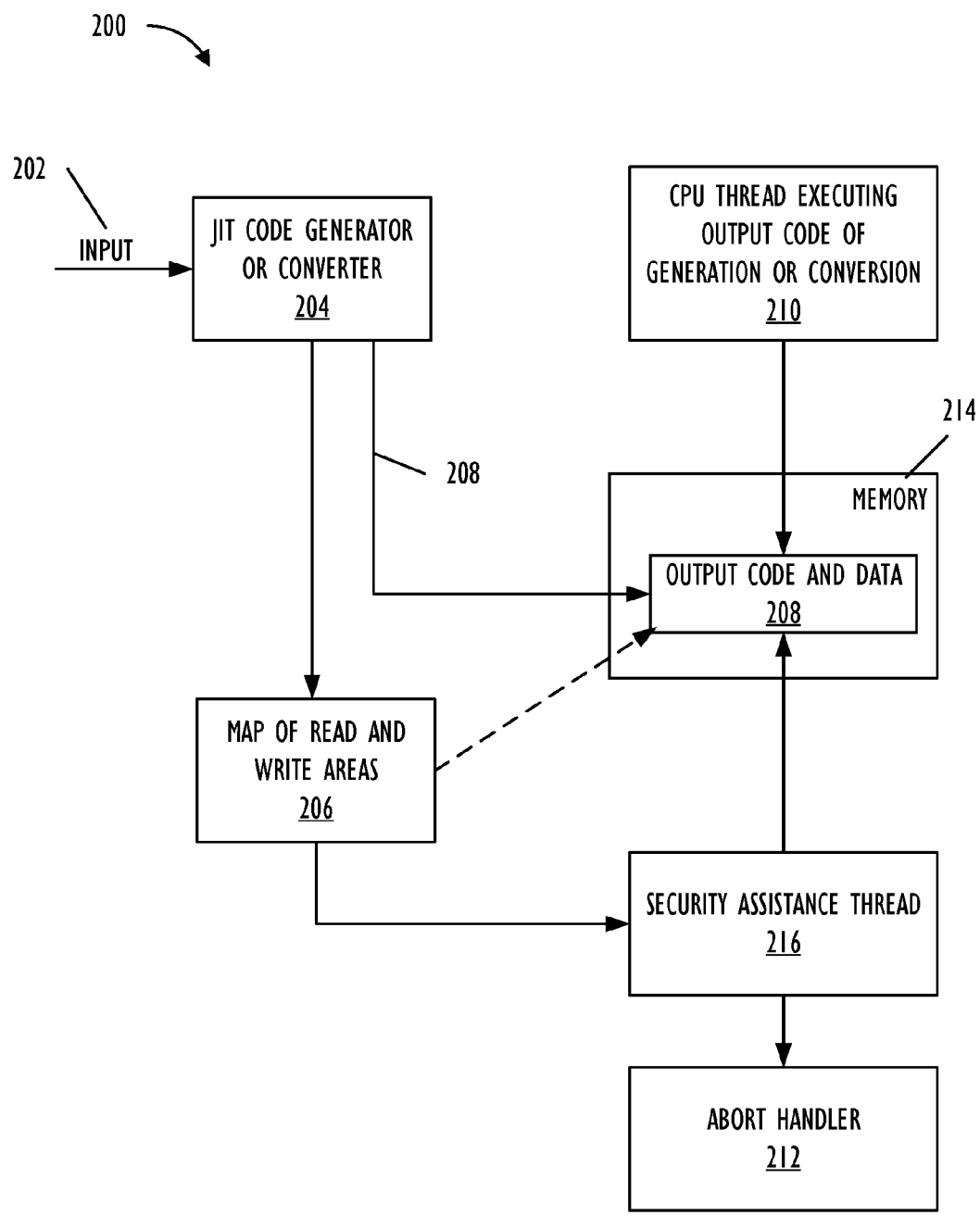
FIG. 2 is a dataflow diagram illustrating a technique for code and data protection according to one embodiment.

FIG. 2 is a dataflow diagram illustrating a technique 200 for real-time code and data protection in a processor such as illustrated in FIG. 1, according to one embodiment. With continued reference to FIG. 1, input code 202 to a converter 204, for example converter 180 of FIG. 1, may include binary code which may be translated through binary translation (BT) into another machine code for execution on a second machine or processor or may be pseudo code or bytecode, that is inputted to the converter 204 for interpreting into native code for execution on the same processor. In an embodiment, input code 202 may be input into converter 204, for example, a BT or JIT converter, a dynamic compiler that is resident on a second machine or processor core for generation of native code directly for execution. In another embodiment, converter 204 may be configured to statically compile as input code 202 received as source code into machine code, which may be subsequently executed on the same machine or processor core.

Converter 204 may translate input code 202 and output dynamically generated output code and data 208 (also referred to hereinafter as "output 208") and a dynamic memory map in block 206. Output 208 may include code and data that is created by translation of input code 202 and, in block 214, may be placed into main memory for execution. Convertor 204 may also align output code and data 208 to cache lines to assist in efficient application of transactional conflict detection. In an embodiment, main memory can be RAM, or the like.

In block 206, a memory map may be dynamically created during conversion of input code 202. For example, a dynamic memory map that may be created maps main memory regions for read-only areas, write only areas, and read/write areas for code and data in main memory. Transactional execution typically uses memory cache lines access data to monitor memory accesses. Therefore it may be practical to map or align protected memory regions in block 206 to cache lines which will define the resolution granularity of detecting memory accesses by controlled code thread. In an embodiment, local cache may be L1 cache, L2 cache, or the like. Local cache may also include a plurality of cache lines that map the read-only and writeable code and data memory locations in the cache to memory locations in main memory. For example, in block 206, a dynamic memory map may identify regions of memory that include modifiable code, non-modifiable code, modifiable data (i.e., read/write access is allowed), and non-modifiable data. The dynamic memory map may also identify specific read-only areas that may need to be protected from writing. In an embodiment, the address of the next instruction to be executed in a fetch operation may also be identified in the memory map. In block 206, the memory map may also create a map of guard memory regions (i.e., additional cache lines or guard area cache lines) that may designate read-only memory locations in the cache. In an embodiment, during execution of output 208 by processor 100, a security assistance thread may be executed as a transaction and determine transactional conflicts with the memory location in local cache, as will be described below.

In block 216, the dynamic memory map from block 206 may be loaded into a security assistance thread 216. In an embodiment, the security assistance thread 216 may be invoked as a security transaction, for execution of a block of instructions for suspicious (or monitored) threads in output 208 that are executed speculatively as an atomic operation. Each suspicious thread or a suspicious code block in a thread is wrapped into a hardware memory transaction (e.g., with TSX), through instructions that start and end a transactional code region (for example, XBEGIN and XEND for Intel® TSX implementation), respectively. In an embodiment, monitored guard memory regions may also be added to a read-set of the security transaction. Security assistance thread 216, during execution, may continuously monitor specific and/or predefined memory areas, such as read-only memory regions or guard memory regions, for transactional conflicts while the monitored thread of generated code is running in parallel. Conflicts may include either writes into monitored memory (e.g., guard memory regions), reads from monitored memory or other accesses to monitored memory that may be undesirable and not according to expected behaviors described in the memory map. During execution of a monitored thread a write to one or more of these guard memory regions causes a read/write conflict that may result in aborting the security assistance thread transaction. Such a write may be a result of an incorrect program (for example, a wrong or uninitialized pointer) or a deliberate boundary violation by malicious code (for example, a buffer overflow exploit). In an embodiment, security assistance thread may execute prior to execution of generated code in order to identify protected areas of cache lines prior to execution of generated code.

In block 210, converter 204 may execute generated output code 208. In an embodiment, converter 204 may execute one or more identified suspicious threads (or monitored threads) in output code 208.

In block 212, an abort handler may be notified in response to any violation and may generate an appropriate response such as, for example, may generate a response for application termination, log entry, security alert or event, network notification, an error message via a display and/or prompt a user for a course of action.

For example, during operation, if during execution of generated code, either a buffer overrun, an erroneous write, or a deliberately malicious write occurs to a read-only area, it could be exploited by malware. For example, malware may execute malicious code by violating a memory boundary, for example, an array boundary. Buffer overruns may be caused by programming errors in an application; however, these errors may manifest themselves as execution violations that can be detected using the dynamic memory map and a security assistance thread, as will be discussed below. During execution of output code 208, converter 204 may execute output code 208 from main memory by fetching, decoding and executing instructions or a stream of instructions into processor 100. Any memory modifications or writes to areas beyond the allowed limits during execution may be detected by security assistance thread 216 executing in parallel, such as modifications to guard memory regions may be treated as security violation and/or as a violation of expected bounds.

Figure 3:
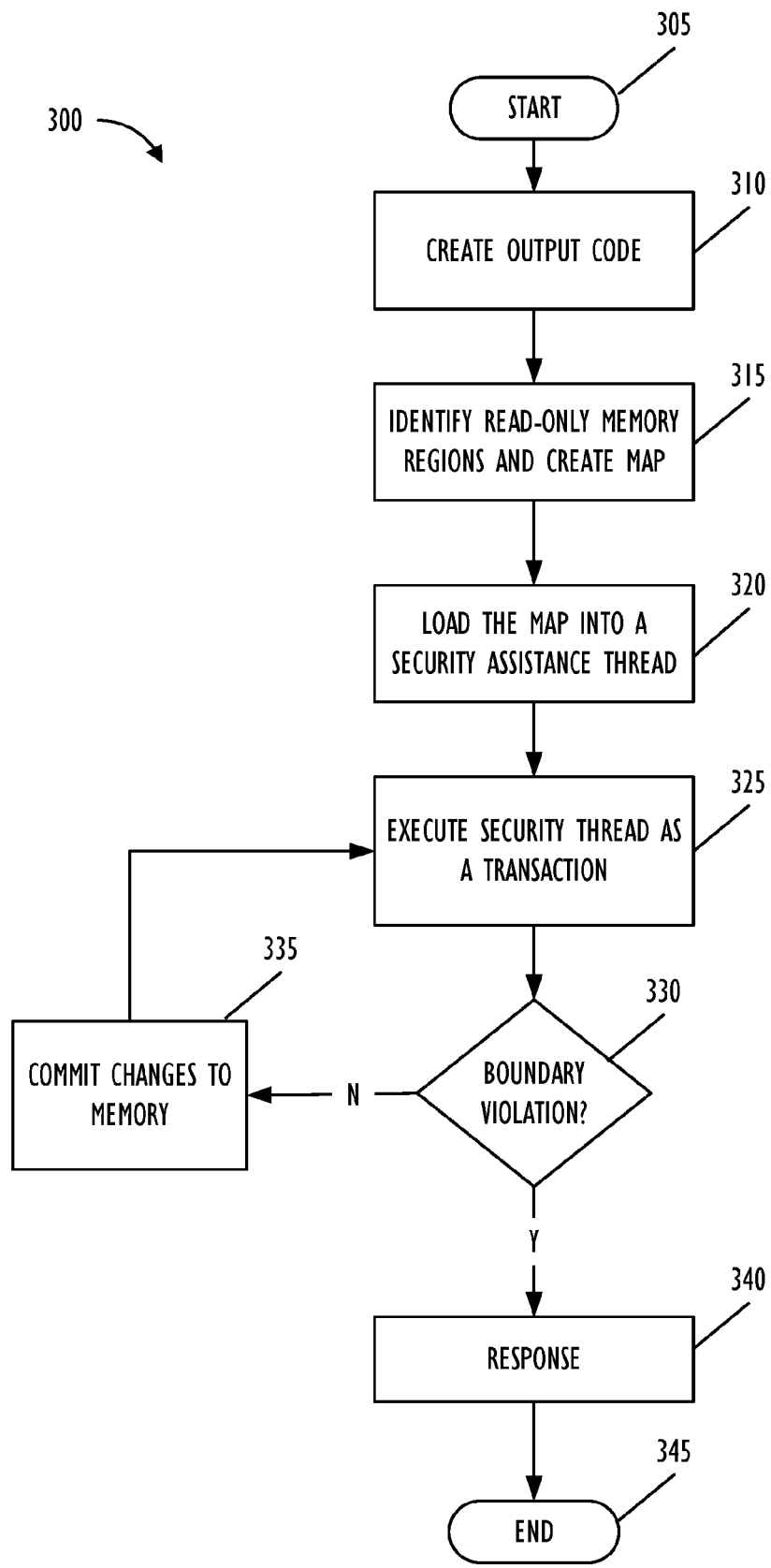
FIG. 3 is a flowchart illustrating a technique for code and data protection according to one embodiment.

FIG. 3 is a flow chart illustrating a process 300 for code and data protection using transactional memory support according to one embodiment. With continued reference to FIG. 2, process begins in step 305.

In 310, output code and data is created from input code. In an embodiment, converter 204 may receive input code as binary code for one processor which may be translated through binary translation into native code for another processor or may receive input code as pseudo code that is converted into native code for execution on the same processor directly.

In 315, converter 204 may identify read only memory regions and create a map. In an embodiment, converter 204 identifies boundaries for read-only areas and write only areas in output code 208 that is stored in main memory 214. Additionally, converter 204 creates a dynamic memory map 206 of output code and data. For example, converter 204 creates a dynamic memory map 206 that maps memory space or regions in main memory 214 to a local cache for defined boundaries for read-only areas, write only areas, and read/write areas based on output in main memory 214. In an embodiment, dynamic memory map 206 may identify regions of memory that are read-only areas that may need to be protected from writing. Memory map 206 may also include a map of guard memory regions (i.e., additional cache lines or guard area cache lines) that may designate read-only memory locations in cache or unused memory locations beyond the writeable areas used for detecting incorrect memory accesses.

In 320, the memory map 206 may be loaded into a security assistance thread 216. In an embodiment, the security assistance thread 216 may be invoked as a security transaction that may acquire suspicious threads in the output code and data 208.

In 325, security assistance thread 216 is executed as a transaction. In an embodiment, security assistance thread 216 may be executed as a transaction that reads pre-defined monitored memory regions, for example, reads guard memory regions. These read operations may add the monitored guard memory regions to the read set of the transaction. In 325 the security thread transaction may be aborted due to a memory access violation. Alternative reasons for a transactional abort may include, for example, transactional capacity exhaustion. These aborts that are not related to the map violation may be ignored and execution resumed or restarted.

Block 330 will execute during a transactional abort and security assistance thread determines if a boundary violation has occurred during the transaction. In an embodiment, execution of a thread by security assistance thread 216 in parallel with execution of generated output code will be two threads involved in a transactional conflict. After security assistance thread 216 accessed the guard memory regions, the processor's transactional mechanism continuously monitors all memory accesses to determine if read-set conflict occurs to the guard memory regions. A read-set conflict occurs if the guard memory region in the read-set is written by another thread, for example, a write into a guard memory region during execution of a monitored thread by converter 204. In an embodiment, security assistance thread 216 determines if writes into guard memory regions occur, reads from guard memory regions occur, or other accesses of guard memory regions by processor 100 during execution of the monitored thread that will be undesirable and not according to expected behaviors described in the memory map 216. During execution of output code 208, any memory modifications, reads, or writes to guard memory regions by processor 100 may be treated as a security violation and/or as a violation of expected bounds. For example, converter 204 writing to a guard memory region and security assistance thread 216 reading from the guard memory region would result in a conflict as read and write accesses from different threads occur in the same cache line. In another embodiment, any memory modifications or writes to areas beyond the allowed limits of cache lines may be treated as security violations and/or as violations of expected bounds such as reads and writes by the parallel security threads to a cache line being monitored.

If there is no boundary violation, which indicates that the transaction is successful (i.e., step 330="N") then, in 335, the processor 100 may commit the memory state of the transaction. Also, code and data stores for cache lines in local cache are cleared and processor 100 may execute another security thread as a transaction in step 325.

However, if there is a boundary violation to a guard memory region or other memory modification to a monitored cache line (step 330="Y"), then, in 340, processor 100 will stop the transactional execution in main memory 214 (transaction abort), roll-back the transaction and perform a security response such as, for example, notify the user that the code may be behaving incorrectly or executing malicious code. In response, a system may retry execution of the malicious code as a transaction and/or submit information for further action. In an embodiment, security software may analyze the abort context. For example, an abort handler specified by the security monitoring thread 216, may check an instruction pointer register (hereinafter "EIP") of the instruction that triggered an abort and perform an action in response to any violation. As the instruction pointer register may contain the address of the next instruction to be executed, the abort handler may also check the validity of the change (e.g., whether the value written into memory is allowed). In another embodiment, a processor trace (e.g., Intel® Processor Trace technology) may be implemented by a security software that may filter out conflicts caused by allowed EIP ranges. In this case, the security software may set up a processor trace recording that may continuously store information about recently executed instructions into a circular buffer or any other kind of a buffer. When a conflict abort happens, the security abort handler may deconstruct an instruction log from the EIP from the circular buffer. If it finds that the logs contain EIPs from the allowed EIP ranges, no security action will be performed; otherwise, a response will occur. In addition to, or alternatively, other instruction/branch tracing capabilities may be used in conjunction with transactional memory based monitoring to reconstruct the flow triggered transaction abort. Process 300 ends in step 345.

Benefits of the embodiments described above include real-time code and data checking for generated or converted that does not change during implementation of transactional memory support. Additional benefits include improved protection against exploitation from many types of vulnerable codes, correct execution of converted code may verify errors in programming code, earlier discovery of vulnerable code as well as errors in BT/JIT converters, flexibility of enforcement through a memory map of controlled areas that is enforced through at least one transactional security thread performing memory reads, and improved granularity of smaller memory guard memory regions over memory pages.

Figure 4:
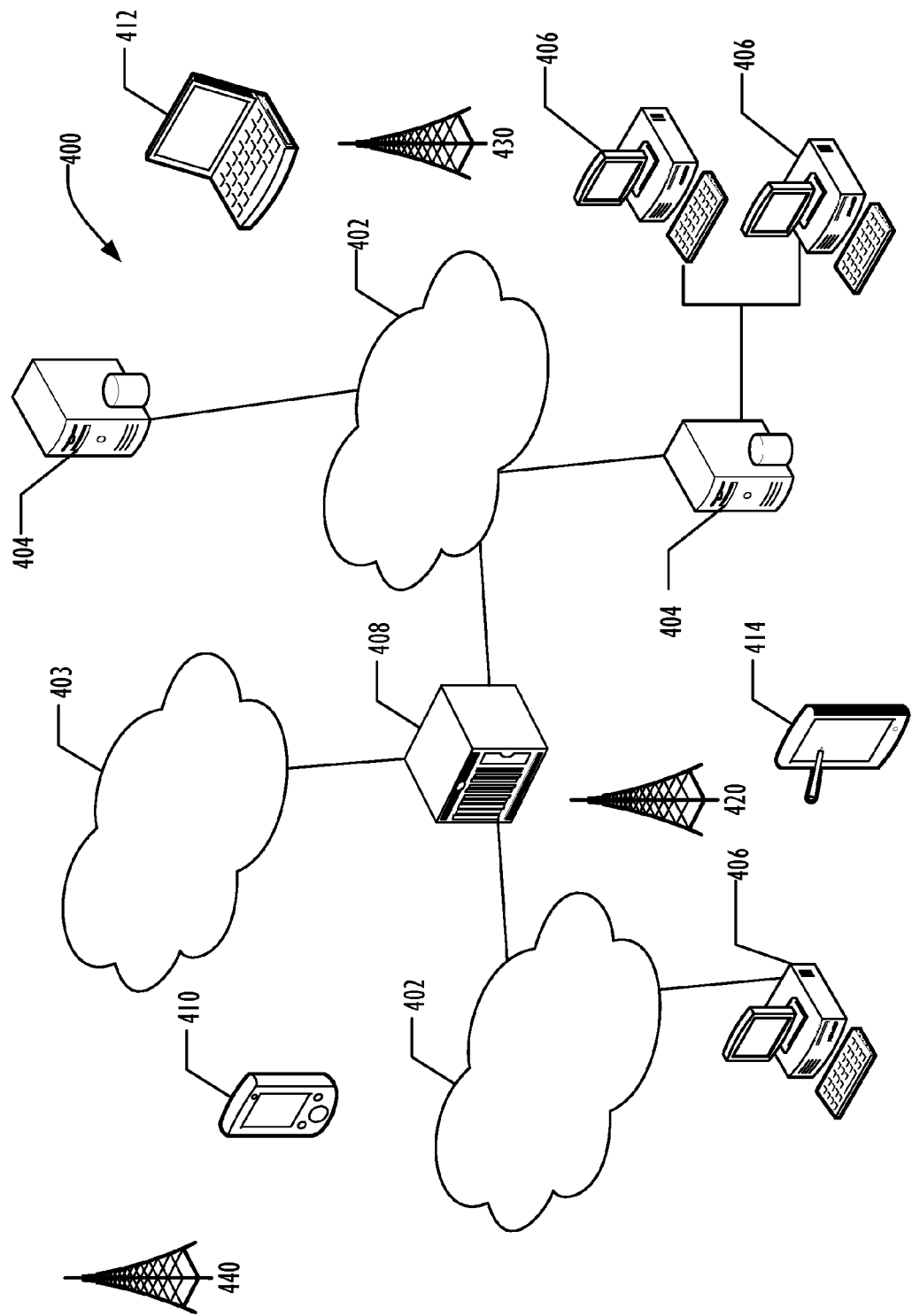
FIG. 4 is a diagram illustrating a network of programmable devices according to one embodiment.

Referring now to FIG. 4, an example infrastructure 400 in which the techniques described above may be implemented is illustrated schematically. Infrastructure 400 contains computer networks 402. Computer networks 402 may include many different types of computer networks available today, such as the Internet, a corporate network or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. Infrastructure 400 also includes cellular network 403 for use with mobile communication devices. Mobile cellular networks support mobile phones and many other types of mobile devices. Mobile devices in the infrastructure 400 are illustrated as mobile phones 410, laptops 412 and tablets 414. A mobile device such as mobile phone 410 may interact with one or more mobile provider networks as the mobile device moves, typically interacting with a plurality of mobile network towers 420, 430, and 440 for connecting to the cellular network 403. Although referred to as a cellular network in FIG. 4, a mobile device may interact with towers of more than one provider network, as well as with multiple non-cellular devices such as wireless access points and routers 408. In addition, the mobile devices 410, 412 and 414 may interact with non-mobile devices such as computers 404 and 406 for desired services, which may include real-time code and data protection described above.

The following examples pertain to further embodiments.

Example 1 is a machine readable medium, on which are stored instructions, comprising instructions that when executed cause a machine to: create output code from input code; identify read-only memory regions to be accessed during execution of the output code; create a memory map for the read-only regions in shared memory; and monitor the read-only regions for a transactional conflict; wherein the read-only regions include one or more guard memory regions in the shared memory.

In Example 2, the subject matter of Example 1 can optionally include wherein the instructions that when executed cause the machine to monitor the read-only regions further comprise instructions that when executed cause the machine to determine whether a boundary violation has occurred to the read-only regions.

In Example 3, the subject matter of Example 1 or 2 can optionally include wherein the instructions that when executed cause the machine to determine the boundary violation further comprise instruction that when executed cause the machine to determine if the same guard memory region is read by at least one security assistance thread and a monitored thread.

In Example 4, the subject matter of Example 1 or 2 can optionally include, wherein the instructions that when executed cause the machine to determine the boundary violation further comprise instruction that when executed cause the machine to determine if the same guard memory region is read by at least one security assistance thread and written by a monitored thread.

In Example 5, the subject matter of Example 2 can optionally include, wherein the instructions further comprise instructions that when executed cause the machine to commit changes to memory responsive to determining that the boundary violation has not occurred.

In Example 6, the subject matter of Example 2 can optionally include, wherein the instructions further comprise instructions that when executed cause the machine to terminate execution of a monitored thread responsive to determining that the boundary violation has occurred.

In Example 7, the subject matter of Example 1 to 6 can optionally include, wherein the instructions that when executed cause the machine to monitor the read-only regions further comprise instructions that when executed cause the machine to monitor the read-only regions using transactional memory support.

In Example 8, the subject matter of Example 1 or 2 can optionally include, wherein the instructions that when executed cause the machine to create the memory map further comprise instruction that when executed cause the machine to execute at least one security assistance thread as a transaction.

In Example 9, the subject matter of Example 1 or 2 can optionally include, wherein the instructions further comprise instructions that when executed cause the machine to execute a monitored thread in the output code.

Example 10 is a method for code and data protection, comprising: creating output code from input code; identifying read-only memory regions to be accessed during execution of the output code; creating a memory map for the read-only regions in shared memory; and monitoring the read-only regions for a transactional conflict; wherein the read-only regions include one or more guard memory regions in the shared memory.

In Example 11, the subject matter of Example 10 can optionally include, further comprising determining whether a boundary violation has occurred to the read-only regions.

In Example 12, the subject matter of Example 10 or 11 can optionally include, further comprising determining if the same guard memory region is read by at least one security assistance thread and a monitored thread.

In Example 13, the subject matter of Example 10 or 11 can optionally include, further comprising determining if the same guard memory region is read by at least one security assistance thread and written by a monitored thread.

In Example 14, the subject matter of Example 10 to 12 can optionally include, further comprising monitoring the read-only regions using transactional memory support.

In Example 15, the subject matter of Example 10 or 11 can optionally include, further comprising executing at least one security assistance thread as a transaction.

Example 16 is a computer system for code and data protection, comprising: one or more processors; and a memory coupled to the one or more processors, on which are stored instructions, comprising instructions that when executed cause one or more of the processors to: create output code from input code; identify read-only memory regions to be accessed during execution of the output code; create a memory map for the read-only regions in shared memory; and monitor the read-only regions for a transactional conflict; wherein the read-only regions include one or more guard memory regions in the shared memory.

In Example 17, the subject matter of Example 16 can optionally include wherein the instructions further comprise instructions that when executed cause the machine to determine whether a boundary violation has occurred to the read-only regions.

In Example 18, the subject matter of Example 15 to 16 can optionally include, wherein the instructions further comprise instruction that when executed cause the machine to determine if the same guard memory region is read by at least one security assistance thread and a monitored thread.

In Example 19, the subject matter of Example 15 to 16 can optionally include, wherein the instructions further comprise instruction that when executed cause the machine to determine if the same guard memory region is read by at least one security assistance thread and written by a monitored thread.

In Example 20, the subject matter of Example 15 to 16 can optionally include, wherein the instructions further comprise instructions that when executed cause the machine to commit changes to memory responsive to determining that the boundary violation has not occurred.

In Example 21, the subject matter of Example 15 to 16 can optionally include, wherein the instructions further comprise instructions that when executed cause the machine to terminate execution of a monitored thread responsive to determining that the boundary violation has occurred.

In Example 22, the subject matter of Example 15 to 16 can optionally include, wherein the instructions further comprise instructions that when executed cause the machine to monitor the read-only regions using transactional memory support.

In Example 23, the subject matter of Example 15 to 16 can optionally include, wherein the instructions further comprise instruction that when executed cause the machine to execute at least one security assistance thread as a transaction.

Example 24 is a method for code and data protection, comprising: creating output code from input code; creating a memory map for read-only regions in shared memory responsive to creating the output code; and executing at least one security assistance thread as a transaction; wherein the read-only regions include one or more guard memory regions in the shared memory.

In Example 25, the subject matter of Example 24 can optionally include monitoring the read-only regions for a transactional conflict.

In Example 26, the subject matter of Example 24 to 25 can optionally include determining whether a boundary violation has occurred to the read-only regions.

In Example 27, the subject matter of Example 24 to 25 can optionally include determining if the same guard memory region is read by at least one security assistance thread and a monitored thread.

In Example 28, the subject matter of Example 24 to 25 can optionally include determining if the same guard memory region is read by at least one security assistance thread and written by a monitored thread.

In Example 29, the subject matter of Example 24 can optionally committing changes to memory responsive to determining that the boundary violation has not occurred.

In Example 30, the subject matter of Example 24 can optionally include terminating execution of a monitored thread responsive to determining that the boundary violation has occurred.

In Example 31, the subject matter of Example 24 to 25 can optionally include identifying the read-only memory regions to be accessed during execution of the output code.

In Example 32, the subject matter of Example 24 to 25 can optionally include monitoring the read-only regions using transactional memory support.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine readable medium, on which are stored instructions, comprising instructions that when executed cause a machine to:
   create output code from input code;
   identify read-only memory regions to be accessed during execution of the output code;
   create a memory map for the read-only memory regions in shared memory; and
   monitor the read-only memory regions for a transactional conflict.

2. The machine readable medium of claim 1, wherein the instructions that when executed cause the machine to monitor the read-only memory regions comprise instructions that when executed cause the machine to determine whether a boundary violation has occurred to the read-only memory regions.

3. The machine readable medium of claim 2, wherein the instructions that when executed cause the machine to determine the boundary violation further comprise instructions that when executed cause the machine to determine if the same read-only memory region is read by at least one security assistance thread and a monitored thread.

4. The machine readable medium of claim 2, wherein the instructions that when executed cause the machine to determine the boundary violation further comprise instructions that when executed cause the machine to determine if the same read-only memory region is read by at least one security assistance thread and written by a monitored thread.

5. The machine readable medium of claim 2, wherein the instructions further comprise instructions that when executed cause the machine to commit changes to memory responsive to determining that the boundary violation has not occurred.

6. The machine readable medium of claim 2, wherein the instructions further comprise instructions that when executed cause the machine to terminate execution of a monitored thread responsive to determining that the boundary violation has occurred.

7. The machine readable medium of claim 1, wherein the instructions that when executed cause the machine to monitor the read-only memory regions further comprise instructions that when executed cause the machine to monitor the read-only memory regions using transactional memory support.

8. The machine readable medium of claim 1, wherein the instructions that when executed cause the machine to create the memory map further comprise instructions that when executed cause the machine to execute at least one security assistance thread as a transaction.

9. The machine readable medium of claim 1, wherein the instructions further comprise instructions that when executed cause the machine to execute a monitored thread in the output code.

10. A method for code and data protection, comprising:
    creating output code from input code;
    identifying read-only memory regions to be accessed during execution of the output code;
    creating a memory map for the read-only memory regions in shared memory; and
    monitoring the read-only memory regions for a transactional conflict.

11. The method of claim 10, further comprising determining whether a boundary violation has occurred to the read-only memory regions.

12. The method of claim 11, further comprising determining if the same read-only memory region is read by at least one security assistance thread and a monitored thread.

13. The method of claim 11, further comprising determining if the same read-only memory region is read by at least one security assistance thread and written by a monitored thread.

14. The method of claim 11, further comprising committing changes to memory responsive to determining that the boundary violation has not occurred.

15. The method of claim 11, further comprising terminating execution of a monitored thread responsive to determining that the boundary violation has occurred.

16. The method of claim 10, further comprising monitoring the read-only memory regions using transactional memory support.

17. The method of claim 10, further comprising executing at least one security assistance thread as a transaction.

18. A computer system for code and data protection, comprising:
    one or more processors; and
    a memory coupled to the one or more processors, on which are stored instructions, comprising instructions that when executed cause one or more of the processors to:
      create output code from input code;
      identify read-only memory regions to be accessed during execution of the output code;
      create a memory map for the read-only memory regions in shared memory; and
      monitor the read-only memory regions for a transactional conflict.

19. The computer system of claim 18, wherein the instructions further comprise instructions that when executed cause one or more of the processors to determine whether a boundary violation has occurred to the read-only memory regions.

20. The computer system of claim 19, wherein the instructions further comprise instructions that when executed cause one or more of the processors to determine if the same read-only memory region is read by at least one security assistance thread and a monitored thread.

21. The computer system of claim 19, wherein the instructions further comprise instructions that when executed cause one or more of the processors to determine if the same read-only memory region is read by at least one security assistance thread and written by a monitored thread.

22. The computer system of claim 19, wherein the instructions further comprise instructions that when executed cause one or more of the processors to commit changes to memory responsive to determining that the boundary violation has not occurred.

23. The computer system of claim 19, wherein the instructions further comprise instructions that when executed cause one or more of the processors to terminate execution of a monitored thread responsive to determining that the boundary violation has occurred.

24. The computer system of claim 18, wherein the instructions further comprise instructions that when executed cause one or more of the processors to monitor the read-only memory regions using transactional memory support.

25. The computer system of claim 18, wherein the instructions further comprise instructions that when executed cause one or more of the processors to execute at least one security assistance thread as a transaction.

* * * * *